UNITED STATES PATENT OFFICE.

NATHAN C. PLATT, OF SALISBURY, NEW YORK.

IMPROVEMENT IN PROCESSES OF SEPARATING TANNIN FROM SOLUTIONS.

Specification forming part of Letters Patent No. 117,455, dated July 25, 1871.

*To all whom it may concern:*

Be it known that I, NATHAN C. PLATT, of Salisbury, in the county of Herkimer and the State of New York, have invented an Improved Process of Obtaining Tannic Acid from Barks; and I do hereby declare the following to be a full, clear, and exact description of the same.

The object of this invention is to provide for the public an improved process by which the tannic acid held in solution in water in which hemlock, oak, or other barks, nut-galls, sumac, &c., have been soaked, steeped, or otherwise treated, can be readily separated and recovered nearly or quite pure at a very slight expense. To this end the process consists in treating the infusion or solution of any bark or other vegetable substance containing tannic acid with a solution of common salt or equivalent substance, as hereinafter set forth.

I take a gallon of liquor leached from bark and of an average strength of ten degrees. I then dissolve about one-quarter of a pound of common salt in two quarts of water, and mix the brine thus formed with the leached liquor. The tannic acid is immediately precipitated; after which I let the liquor stand for a few hours till it settles, when I pour off the brine, and strain, dry, and grind the residuum, which will be nearly or quite pure tannic acid, the gums and other vegetable substance not having been precipitated, but having passed off with the brine.

The proportions may be somewhat varied, and the quantity and strength of the brine will always, of course, depend upon the quantity and strength of the leached liquor.

Instead of common salt, saltpeter, alum, and other saline crystalline substances may be employed, with a result more or less approximating that produced by the solution of salt.

Having thus described my invention, what I claim as new, and desire to secure by Letters Patent, is—

The process of obtaining tannic acid from leached liquors, infusions, or solutions of vegetable subtances by the use of saline baths or solutions, substantially as described.

NATHAN C. PLATT.

Witnesses:
NATHAN K. ELLSWORTH,
A. C. RAWLINGS.